Patented Apr. 1, 1941

2,236,602

UNITED STATES PATENT OFFICE 2,236,602

INK FOR CARBON PAPER

Samuel A. Neidich, Ventnor, N. J., assignor to Underwood Elliott Fisher Company, New York, N. Y., a corporation of Delaware No Drawing. Application June 29, 1937, Serial No. 150,927

3 Claims. (Cl. 260—736)

This invention relates to inks and ink materials and more particularly to dope for application to transfer or carbon paper.

The principal objects of the invention are to improve generally the dope applied to carbon paper and to produce a dope which will enable sharper imprints to be secured and which will increase the toughness of the composition coating and the durability of the carbon sheets.

Dope for carbon paper usually contains one or more non-drying oils, one or more waxes and coloring materials. In accordance with the present invention, a toughening plasticizer for the wax is employed as an ingredient of the dope. In the formula which is preferably employed this ingredient consists of chlorinated rubber. The use of this material tends to plasticize the wax contained in the dope in such a way as to render it tougher with the result that the carbons give a sharper imprint.

The following is a typical formula in which chlorinated rubber is used. In this formula, the ingredients are given in the proportions by weight which, in actual practice, have been employed and found to produce carbon paper giving highly satisfactory reproductions or copies.

| | Parts |
|---|---|
| Petrolatum | 42 |
| Carnauba wax | 30 |
| I. G. wax | 10 |
| Chlorinated rubber | 10 |
| Carbon black | 14 |
| Methyl violet | 6 |
| Nigrosine | 10 |

The I. G. wax is a synthetic commercial wax sold under the above trade name.

For a description of this wax reference may be had to patent to Wade No. 2,081,518 dated May 25, 1937.

The chlorinated rubber which has been employed in the formula is of the type sold under the trade name "Tornesit."

It is to be understood that the invention, except as defined in the claims of this application, is not limited to the particular ingredients given in the above formula, but that the ingredients themselves and the proportions thereof may be varied as required to produce the best results.

The ingredients of the formula may be compounded in any manner found to produce a satisfactory composition.

In one method of compounding these ingredients employed by the inventor, the petrolatum, carnauba wax, I. G. wax, carbon black, methyl violet and nigrosine are all melted together and the chlorinated rubber is dissolved in toluol before being added to the other materials. The solution of chlorinated rubber in toluol is then added to the compound formed of the above materials and all are ground together in a hot mill which eliminates the toluol from the formula. The compound is then ready for application to the paper and is applied in the usual way.

As above stated, the chlorinated rubber in the formula tends to plasticize the wax and renders it tougher and more resistant to the blows of the type. The imprint of carbons to which this composition is applied is considerably sharper and more legible than produced by the usual carbons and the durability of the paper is substantially increased.

Having explained the nature and objects of the invention and having specifically described a compound embodying the invention in its preferred form, what is claimed is:

1. A transfer material adapted for use in the manufacture of carbon paper for typewriter work and comprising petrolatum, wax, one or more pigments and chlorinated rubber in a quantity about equal to twenty-five percent by weight of the wax, said material having its ingredients compounded in the proper proportions to produce a composition which, when applied to paper, will form a transfer coating transferable to a paper copy sheet at atmospheric temperatures by the force of the types of a typewriter.

2. A transfer material adapted for use in the manufacture of carbon paper for typewriter work and comprising the following constituents in about the following proportions by weight; one third petrolatum, one fourth coloring matter, one third wax and one twelfth chlorinated rubber, said material having its constituents combined in proportions to produce a composition which, when applied to paper, will form a coating transferable at atmospheric temperatures to a paper copy sheet by the pressure of the types of a typewriter.

3. A transfer dope for carbon paper for typewriter and similar work comprising the following materials in about the proportions indicated by weight: petrolatum 42 parts, wax 40 parts, chlorinated rubber 10 parts, coloring materials 30 parts.

SAMUEL A. NEIDICH.